April 24, 1951 J. B. DUBE 2,549,787
CALCINING KILN
Filed Nov. 21, 1947 4 Sheets-Sheet 4
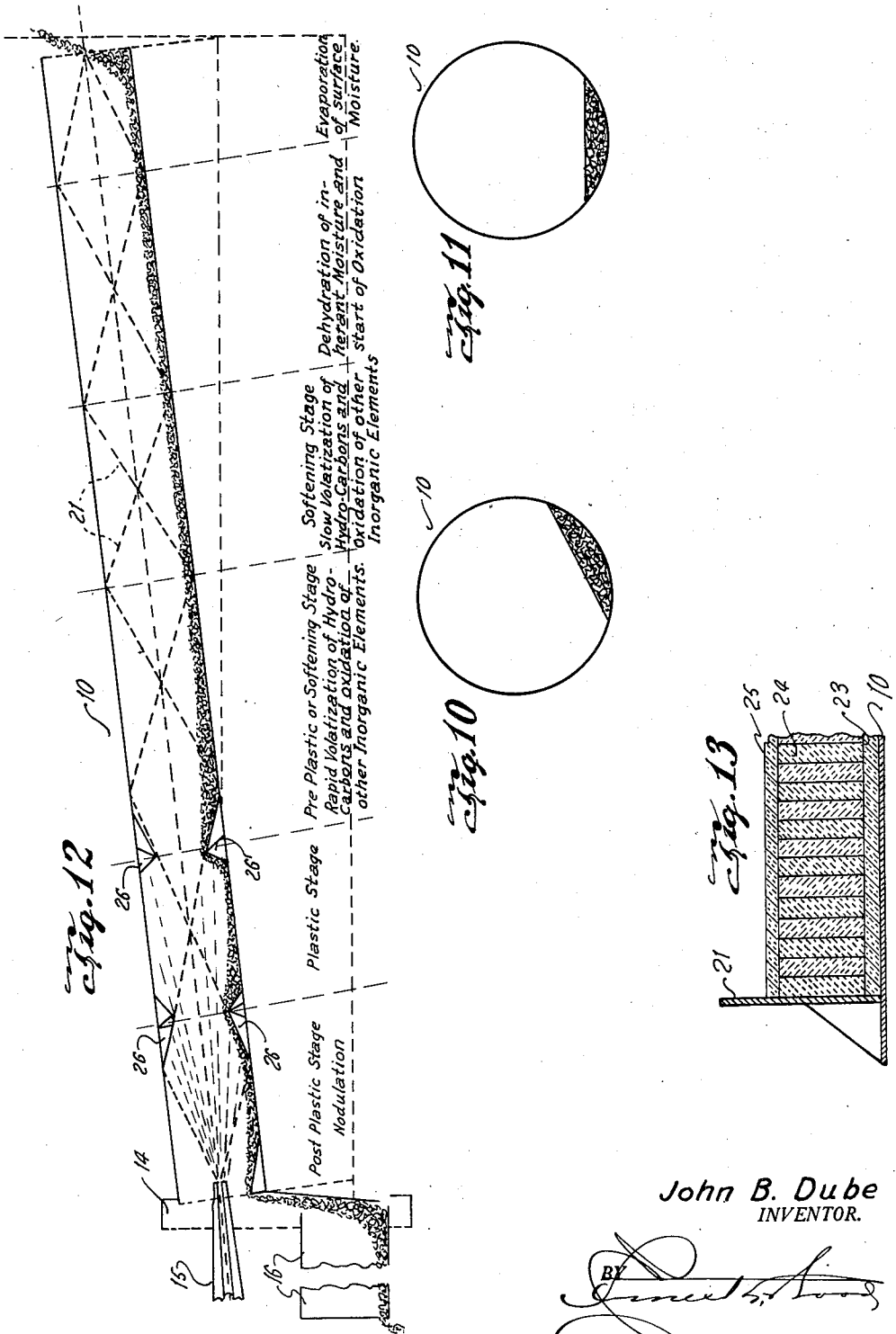
John B. Dube
INVENTOR.
ATTORNEY Patented Apr. 24, 1951

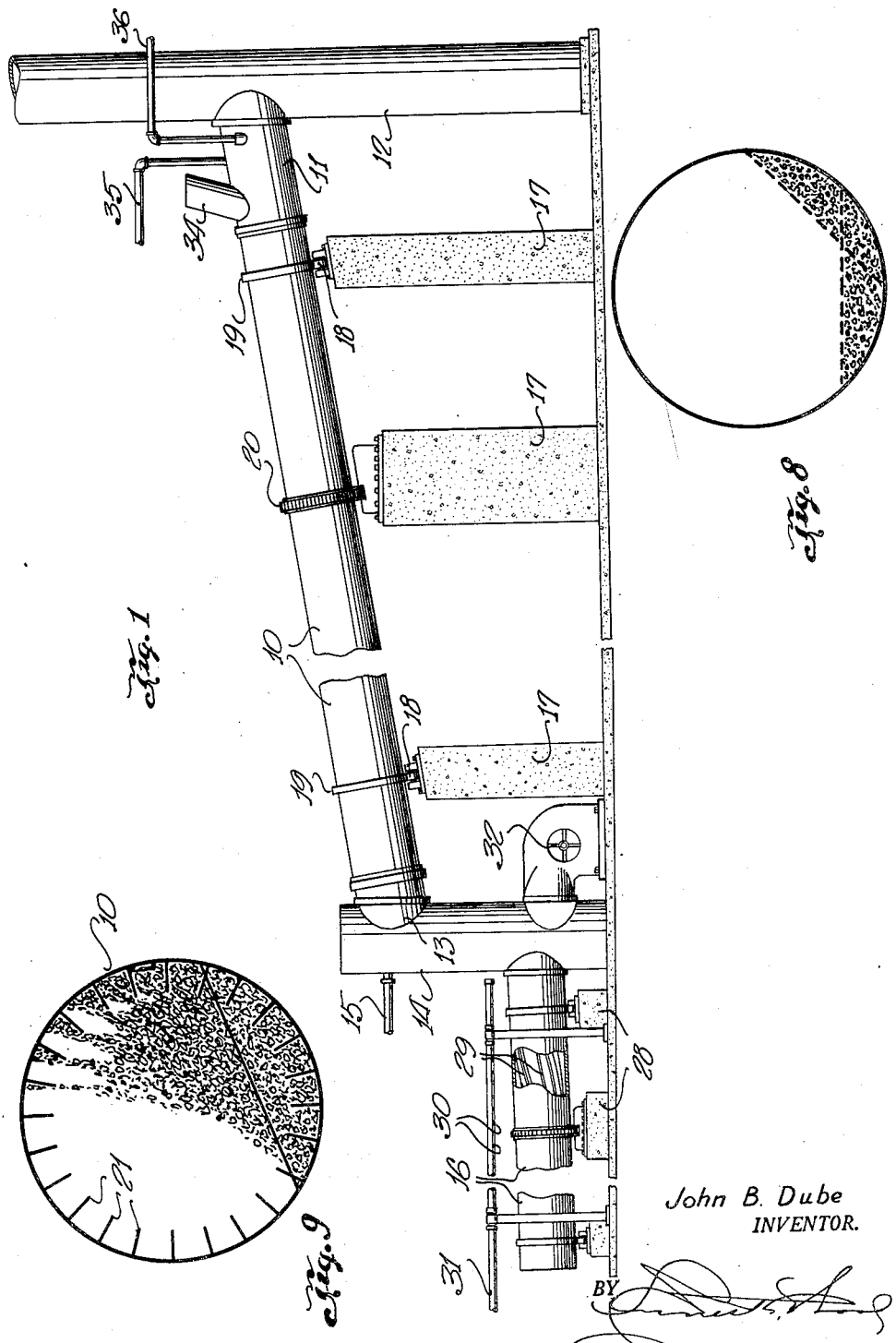

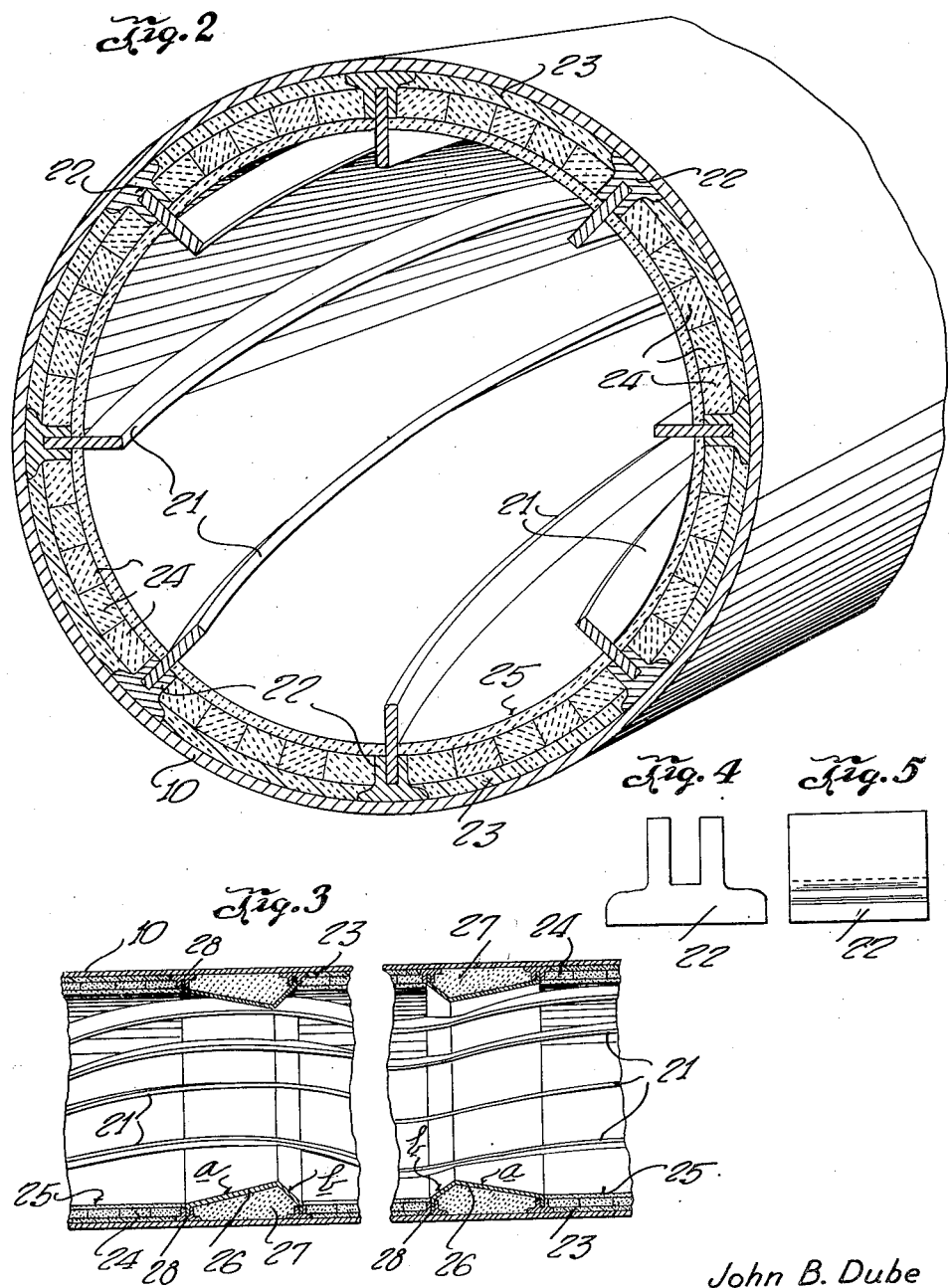

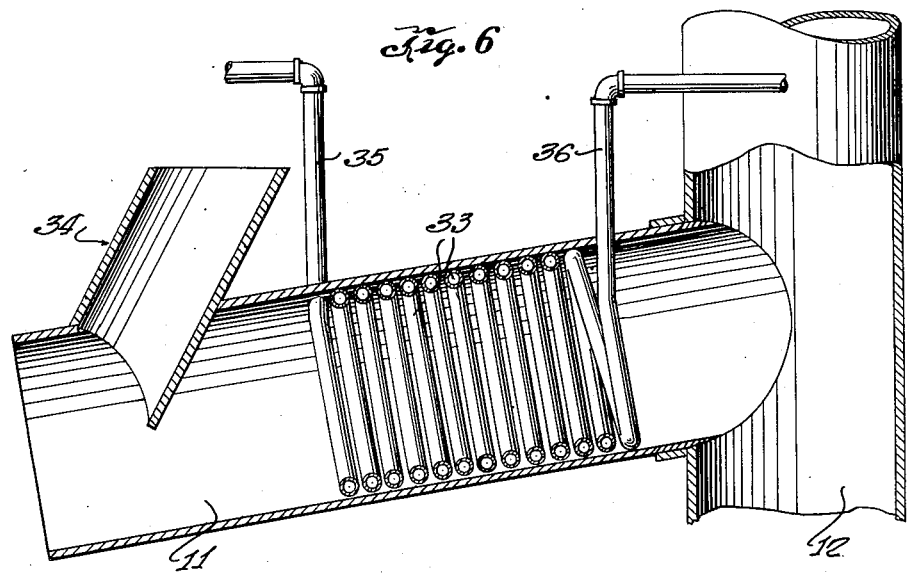
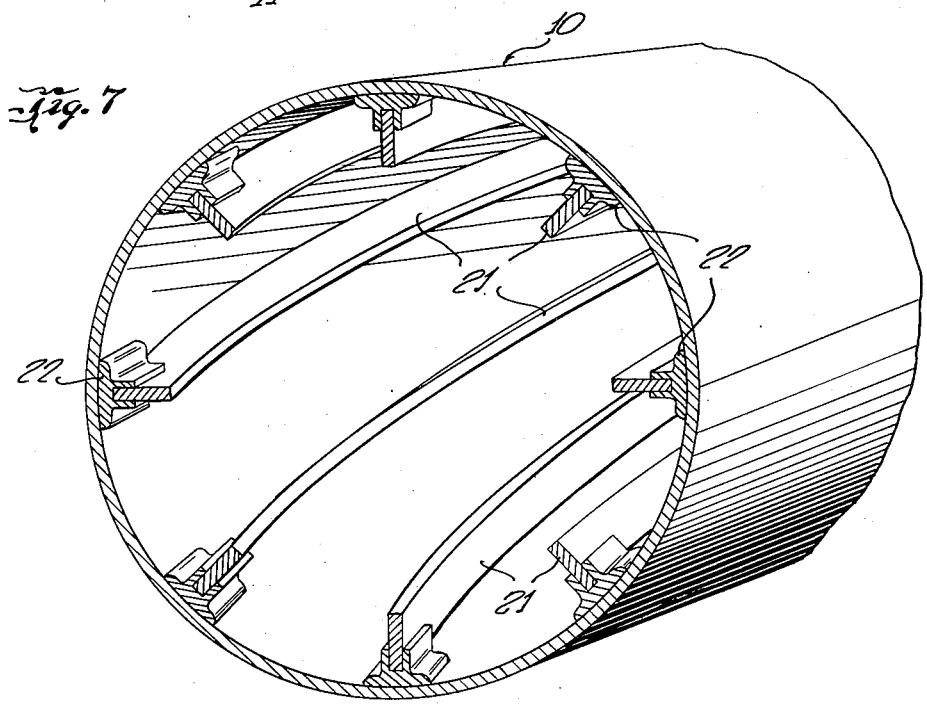
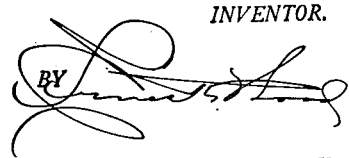

2,549,787

UNITED STATES PATENT OFFICE 2,549,787

CALCINING KILN

John B. Dube, Dallas, Tex.

Application November 21, 1947, Serial No. 787,347

6 Claims. (Cl. 263—22)

This invention relates to the art of processing ores and it has particular reference to new and useful improvements in rotary kilns employed for calcining various minerals for use in the manufacture of pig iron, cement and many other products.

The principal object of the invention is to provide a calciner by which it is possible to materially increase the production of concentrate of a superior quality, yet with a lowering of heat radiation and consequent saving in fuel. Moreover, through and by virtue of the herein described apparatus and process, loss of concentrate dust through chimney draft and dispersion is avoided which not only constitutes a feature of conservation but also obviates a heretofore annoying characteristic in the conventional handling of ores in which the dust is permitted to spread over a wide area surrounding the plant to the discomfort of adjacent property owners.

Another object of the invention is to provide a calciner consisting primarily of an inclined rotary kiln, adequately insulated to reduce radiation of heat to a negligible degree and in which is arranged a plurality of spirally arranged risers by which it is possible to control the movement of materials through the kiln to retard ore roasting with a consequent lowering in the degree of oxidation, as well as to constantly shift the materials to expose maximum surface thereof to the discharge of a burner moving counter to the travel of materials through the kiln.

Still another object of the invention is to provide a rotary calcining kiln in which is arranged annular, spaced apart dams whose function is to divert temperature from directly contacting the ore which has reached the plastic stage in the kiln, thus avoiding the formation in the hot critical space of the plastic zones a thick ring of fused materials which, in conventional kilns, requires periodic and expensive shutdowns for the purpose of breaking and cleaning away the hardened accumulations.

Yet another object of the invention is to provide a rotary calcining kiln consisting of a cylindrical steel shell, interiorly insulated with laminations of suitable refractory and, superimposed on the refractory in a crucible lining of graphite which possesses the quality of further insulating the shell but its chief advantage is to preclude adherence of the plastic mass to the refractory as well as retarding the erosive action of the material on the refractory.

Broadly, the invention comprehends an apparatus of the character set forth as well as the steps of the process for calcining materials of different characteristics including the steps of causing materials to travel the length of a rotating insulated zone while being subjected to high temperatures; in periodically inverting and shifting the mass in a pre-plastic state to expose maximum surface thereof to heat; in retarding the travel of the mass in a plastic stage and in diverting temperature therefrom and finally in cooling the mass in a post-plastic stage and in simultaneously driving off and collecting iron concentrate dust.

With the foregoing and other objects in view, the invention has further reference to certain features of accomplishment as well as the steps of the process to be set forth in the following specification and illustrated on the accompanying drawings wherein:

Figure 1 is a side elevational view of a calcining kiln constructed according to the invention.

Figure 2 is a fragmentary perspective view of the kiln in transverse section.

Figure 3 is a fragmentary view of the kiln in longitudinal section showing the material retarding dams.

Figure 4 is a detail end elevational view of one of the riser supporting brackets.

Figure 5 is a side elevational view thereof.

Figure 6 is a detail view of the material receiving chamber of the kiln and the chimney, partly in vertical section and also the manner in which water is preheated for separating the ore and clays prior to calcining.

Figure 7 is a fragmentary perspective view of the kiln shell prior to installation of the insulation.

Figure 8 is a transverse section of a calcining cylinder schematically showing the action of ore without recess, and Figure 9 is a similar view showing risers and their effect in tumbling the ore.

Figs. 10 and 11 are diagrammatic views showing the action of the material within the kiln where the risers are omitted.

Fig. 12 is a diagrammatic view showing the passage of the material being treated through the various stages of the kiln from inlet to outlet.

Fig. 13 is a detail cross-section through the kiln showing a modification of the structure thereof.

Continuing with a more detailed description of the drawing, reference is primarily made to Figure 1 wherein numeral 10 denotes the kiln proper, to be presently described in detail, which may be made in various lengths and diameters depending upon the nature of the material to be processed. The kiln is inclined with the upper or feed end rotatably in communication with a stationary cylindrical material receiving chamber 11, the latter, in turn, being in communication with a chimney or stack 12.

The lower or discharge end of the kiln is in rotatable communication with an extension 13 on a casing head 14 which latter houses a burner which enters the end of the kiln and is supplied with fuel through a conduit 15. The casing head 14 conserves the heat of combustion of the burner, not shown, which latter may be of any suitable construction but is preferably of the type employing powdered coal as fuel. The casing head 14 also provides a face for material as it is discharged from the kiln into a cooling cylinder 16 to which further and more explicit reference will be presently made.

The kiln is supported intermediate its ends by columns 17. Two of these columns 17 support rollers 18 upon each of which rests an annulus 19 surrounding the kiln while the intermediate column carries a suitable driving means for imparting rotation to the kiln through the medium of an annular gear 20 therein.

Referring specifically to the kiln, attention is directed first to Figure 7 wherein is shown the outer steel shell of the kiln which will bear the reference numeral 10. Within the kiln is arranged a plurality of risers consisting of elongated plates 21, made preferably of chrome steel for its high heat resistance. These plates are each spirally disposed and extend throughout the length of the kiln in a spiral fashion. The number of these risers and the pitch of their flights determines the speed at which the material is passed through the kiln.

In Figures 4 and 5 is shown a bracket 22 designed to support the risers 21 in spaced relationship with the inner surface of the shell 10 in order to reduce to the lowest possible degree the transfer of heat from the interior to the exterior of the shell through the risers. Each riser is supported by a plurality of brackets 22, spaced apart, each consisting of a body having cast integral therewith parallel ears between which the riser is disposed and permanently secured as by welding. The brackets are secured in like manner to the inner wall surface of the shell 10. It is obvious therefore that a space is defined between the under edge of each riser and the shell wall between each bracket 22.

Against the inner wall surface of the shell 10 and underneath the risers 21 is applied a layer of plastic insulating material 23. This insulation is jammed in place to fill the spaces between the risers and shell and is self hardening.

Upon the plastic insulation 23 is laid refractory bricks 24 to completely cover the surface thereof. These refractories are retained by refractory cement or in any other manner suitable for the purpose and capable of withstanding for long periods of time the extreme high temperatures prevailing in the kiln.

Without the risers 21, the mass of ore in the kiln forms an arc and covers the bottom thereof the full length of the cylinder which is 300 feet, more or less, in length. At the feed end of the kiln the hard ore mass will rise approximately 3 feet on the face of the refractory lining in the direction of the kiln revolving motion before the mass slides back to its original position. This rising and sliding action continues in the full length of the cylinder simultaneously. However, a small portion of the ore mass on the upper or exposed surface slides or rather rolls down to the refractory surface before the mass begins its downward slide. It is this upper or exposed surface of the mass that is in immediate contact with the heat current within the cylinder. As a consequence, the heat transmission from the outer surface to the inner portion of the ore mass is slow due to the relatively small surface of the ore mass that is exposed to the heat current. Due to the up and down sliding action and the slow advance of the mass toward the discharge end of the kiln, the under portion of the ore generally may not reach the upper or exposed heat surface until the mass has traveled approximately one hundred feet toward the hot zone of the kiln. The pyro-reaction and the ore mass is thereby greatly retarded and in the end causes a lower degree of concentration of iron in the ore.

As the mass of ore is conveyed down the kiln it emerges into a zone of gradually increasing temperatures. Several formulas have been advanced to determine the rate or speed of reaction by added temperatures. However, these formulas are not in agreement but the fact remains that there is a tremendous increase in speed of reactions with the rise in temperatures. As the ore to be processed in one case, for instance, is siderite, or an iron carbonate, the objective desired is to free the carbonate or the $CO_3$ from the ore. Hence the importance of exposing the greatest surface of the ore mass to accelerate the pyro-chemical reaction during the movement of the ore mass toward the hot zone in the kiln.

Upon reaching approximately 1750° F. the ore approaches the start of the softening stage. Up to the point of reaching 1900° F., the ore becomes softer and that condition of the ore is known as the pre-plastic stage. From 1900° F. to 2000° F. the ore is in the primary stage of the plastic zone which extends approximately 30 feet. This is known as the hot zone in the calciner near the discharge end of the kiln where is located the burner nozzle to which is supplied, through pipe 15, the combustibles for the heat desired. However, the 2000° F., as specified above, does not mean that it constitutes the highest temperature to be obtained. Different minerals require different temperatures to acquire desired results. Temperatures desired can be obtained by regulating the flow of combustibles and the oxidizing agent. When the mass of ore has passed the plastic stage, it enters the post-plastic stage, or cooling and nodulating or pulverizing zone to the discharge end of the calciner.

In the absence of the risers 21, when the ore reaches the plastic state, the ore mass in its softened condition continues to rise and fall as in the pre-plastic zone. The pyro-reaction of the ore causes a gradual concentration of the metal from the feed end of the kiln to the discharge end. In the plastic zone, the ore has attained its greatest degree of softness. The weight of the mass at this point, due to its upward and downward motion, causes some of the softened or plastic ore surface to adhere to the face of the refractories 24 and in a few days of operation of the kiln causes a ring of iron to be formed which covers the circumference of the cylinder. When this ring has reached a certain thickness, various conical structures are formed and cause a great irregularity in the calcining process. At this stage the operation of the kiln must be stopped to remove the iron deposits formed which may attain a thickness of from 12 to 18 inches. This ring formation causes a stoppage of operation lasting from four to five days. Again, this stoppage occurs two and three times a month.

To obviate or prevent these forced interruptions, the risers 21 in the plastic zone eliminate the up and down sliding movements of the ore mass, the same action that occurs throughout the length of the film. Each riser carries a portion of the ore mass above the upper level of the mass and permits the ore to fall gradually onto the mass below. Hence, the exposure of a much greater surface of the ore to the action of the heat of combustion. By this means, the production of the ore concentrate becomes an uninterrupted operation and the pyro-reaction is rendered more effective. As a consequence, the finished concentrate acquires a higher percentage of iron content in relation to mass of the ore.

It is important also to reduce as much as possible the effects of abrasion of the sliding action of the ore on the refractory. The risers 21 obviate much of the erosion by eliminating the sliding action of the ore hence prolonging the life of the refractories.

As a further aid in preventing erosion of the refractories 24, a layer 25 of graphite is applied to the surface of the refractories to produce a crucible surface which possesses a high resistance to adherence of the plastic ore thereto. Graphite is practically pure carbon which cannot be burned except at extremely high temperatures. This substance, having good electric conductivity, resistance to acid and to high temperatures is an exceptionally good medium for affording an infusible crucible lining for the kiln and is applied thereto by means of acetylene torches.

In its travel down the revolving kiln, the material reaches the plastic stage and in order to obviate this colloid sol or plastic condition, which is a delicate process and depends greatly on the thorough dispersion of the constituents of the ore reduced, a means must be employed to divert the heat current and by-pass the plastic area. This is accomplished by isolating or separating the preplastic and the post-plastic zones of the kiln from the plastic zone. Two annular dams of a predetermined height are constructed in the kiln. These dams are shown in Figure 3 and each consists of a metal shell 26, formed with a gradual rise $a$ and an abruptly inclined opposite surface $b$. The shells 26 of the dams are out of thermal contact with the shell 10 of the kiln because of the intervening insulating material 27 and the anchoring brackets 28 which serve to hold the dams fixedly to the inner surface of the shell 10.

The gradual rise $a$ of the dams serving as lifters have the effect of retarding the flow of the material into the plastic zone between the dams, thereby causing an accumulation or thickening of the ore body at the dam. This retardation and thickening of the ore mass in a measure will harden the nodules of the ore. At the discharge end, the ore then falls down abruptly over the dam surface $b$ into the plastic zone and travels toward the end of the plastic area. At the discharge end of the plastic area the companion dam with its positive lifter $b$ will discharge the product and, by changes in length will determine the bed depth of the product to conform to any operating conditions desired and will remove the ore as delivered to the lower end of the retort. Changes in the length or reach of the discharge lifters of the dams provides control of the depth of the bed or mass of ore and of the length of the bed of material in the post-plastic state of the entire process.

The discharge dam or the dam nearest the discharge end of the kiln is disposed so that its inclined face $a$ will afford a deflector to divert the heat of the burner nozzle in a rising movement and direct the heat, usually 2000° F. at this point in the kiln, over the plastic area to the top of the kiln and then carom down and up in the oxidizing or pre-plastic zone without loss of heat to the ore in the plastic zone between the dams. As the plastic area or length is short, i. e., approximately 30 to 35 feet in a 300 foot kiln, the ore will flow down the lifter on the discharge end and will travel through the plastic area without acquiring sufficient plasticity to cause a thick ring to be formed in the hot critical space of the plastic zone. Once past the second dam, the ore will present no further problem, such as leaving accumulations of iron requiring expensive shutdowns for its removal.

Further retardation of the ore before the finished ore is discharged from the kiln may be effected by placing another dam at the end of the cylinder to increase the depth of the mass. Such brief retention at the discharge end of the kiln causes an additional separation or dispersion of the undesirable elements in the ore and analyses show a definite increase in the percentage of metallic iron in the finished calcined ore over the finished ore as produced by conventional methods.

In Figure 1 is shown a cooler into which the product is discharged by the kiln. This cooler, previously referred to, consists of the inclined cylinder 16, revolubly supported on columns 28 and within the cylinder is arranged a series of spiral flights 29 whose function is analogous to that of the risers 21 in the kiln 10, i. e., to constantly change the position of the finished calcined ore and expose maximum surface thereof to walls of the cylinder which latter is constantly cascaded with water emanating from a series of orifices 30 in the length of a pipe 31. Upon emergence from the cylinder 16, the ore is deposited onto a conveyor, not shown, for further processing.

When the bright, cherry red ore is discharged from the kiln 10 into the cooling cylinder 16, the temperature thereof is approximately 1550° F. This is the temperature at which the softening of the feed ore starts in the pre-plastic zone of the kiln. The purpose of the cooler then is to reduce this temperature to a degree below 200° F. in order to convey the ore to storage or to a carloading station. The absorptive quality of the cold water with which the cylinder 16 is blanketed and the high K-factor of the bare steel shell induces heat by conductivity to be transmitted from the hot ore to the water. This action causes a sudden contraction of the ore with the spalling effect of detaching very fine particles that form a cloud of iron carbonate dust in the cooler. Air in great volume is induced into the cooling cylinder 16 through the medium of a blower 32 has the property of absorbing heat from the ore as it is forced through the cooler and carries with it the aforementioned dust, finally depositing the latter in a receiving bin (not shown) at the discharge end of the cooler. Suitable provisions may be made to precipitate and collect the dust in order to prevent its escape, as it does under present conditions through the chimney, from which it is spread on properties surrounding the plant to perhaps cause damage which could be the cause of legal controversy. The dust collected and preserved in the manner described has a definite monetary value and is used by industry for special purposes. Hence, what has heretofore been considered a waste product is converted into a useful and valuable medium of revenue.

As a further measure of conservation, the invention aims to preclude waste of heat used in the process. Flue gases, dust, excess air and nitrogen carry from 700° to 800° F. of temperature up the chimney and out into atmosphere, which becomes a preventable loss.

With the elimination of the iron dust and excess air from the cooler, the usual wasted products of combustion can be utilized advantageously by heating water in a coil 33 (Fig. 6) which is set into the feed cylinder 11 rearwardly of the feed chute 34. The form of this coil is such that it will not interfere materially with the draft of the calciner.

Water entering the coil 33 through pipe 35 may reach a temperature of approximately 175° F. and a pipe 36, properly insulated, is provided for conveying the heated water to a separation cone and shaker screen (not shown). Ordinarily, cold water is used to separate foreign substances from the ore but it has been discovered that greatly increased results are possible using heated water. Cold water contracts the siderite clay and other foreign matter and causes them to adhere tightly to the ore being treated or washed. This clay has a very pronounced property of adhesiveness and the cold water cannot detach all the clay from the ore. By heating the water with the heat of the calciner, the tenacious clay will expand, becoming detached and thereby produce a cleaner ore to be introduced into the calciner through the feed chute 34. The percentage of metallic iron will be increased from approximately 63 percent to at least 65 percent as compared with conventional processes.

Manifestly, the construction and process as shown and described is capable of some modification and such modification as may be construed to fall within the scope and meaning of the appended claims is also considered to be within the spirit and intent of the invention.

What is claimed is:

1. A calcining kiln including an inclined, rotatable cylinder insulated against temperature radiation, a plurality of radial risers extending spirally in said cylinder, each in unbroken continuity, from one end to the other thereof, means for holding said risers out of thermal contact with said cylinder, a burner in the discharge end of said cylinder, relatively spaced smooth faced dams within the circumference of and within said cylinder, defining the area of greatest radiant energy intensity and shaped to divert the heat of said flame towards the axis of the cylinder throughout said area during passage of material through the plastic zone of said kiln, a stationary feeding cylinder at the feeding end thereof, and a rotary cooling cylinder at the discharge end thereof of said kiln.

2. A calcining kiln including an inclined rotary cylinder having internal laminations of heat insulating material, a plurality of spirally arranged risers partially embedded in the insulation of said cylinder and extending radially inward from said insulation for tumbling ore products in their downward course through said cylinder, said risers each being of unbroken continuity throughout the length of said cylinder, a burner at the discharge end of said cylinder, spaced apart smooth faced dams annularly arranged within the circumference of said cylinder out of thermal contact with the wall thereof and defining an intermediate plastic zone of highest heat intensity, said dams each having an inclined face, the face of one of said dams being effective to lift material into said plastic zone, the face of the companion dam being adapted to divert the radiant energy of said flame towards the axis of the cylinder throughout said plastic zone, means for feeding material into said cylinder, and means for cooling material discharged from said cylinder.

3. In a calcining kiln, an inclined, rotary cylinder, laminations of heat insulating and refractory material in said cylinder, a crucible lining of heat and abrasive resisting graphite on said insulating material, a series of spirally arranged risers partially embedded in said insulating material but out of contiguity with the wall of said cylinder, said risers extending radially inwardly of said cylinder to maintain constant shifting of ore concentrate in its course through said cylinder each of said risers extending in unbroken continuity throughout the length of said cylinder, means for feeding said cylinder, a burner at the discharge end of said cylinder, relatively spaced, smooth faced annular dams at a predetermined point in said cylinder within the circumference thereof defining an intermediate plastic zone of greatest heat intensity, one of said dams being adapted to lift material into said plastic zone, the other dam being effective to divert the radiant energy of said flame towards the axis of the cylinder throughout said plastic zone, and a rotary cooler for receiving calcined material from said cylinder.

4. In a calcining kiln, an inclined, rotary cylinder into one end of which is fed material to be treated, a burner in the opposite end of said cylinder, a plurality of spirally arranged risers within but out of thermal contact with the wall of said cylinder and adapted to tumble said material in its course through said cylinder, said risers each extending without interruption throughout the length of said cylinder, laminations of heat insulating and refractory material covering the inner surface of said cylinder but exposing said risers, a crucible lining of abrasive and heat resisting graphite on said refractory material to preclude adherence of material being treated, means at a predetermined point within the circumference of said cylinder defining a plastic zone and adapted to predetermine the bed thickness of said treated material and to divert therefrom the radiant energy of said flame, and a rotary cooling cylinder into which calcined material is discharged from said calcining cylinder.

5. Apparatus for calcining ores including an inclined, rotary calcining cylinder interiorly insulated against heat radiation into one end of which is fed material to be treated, a burner in the opposite end of said cylinder, spirally arranged risers radially disposed in said cylinder and partially embedded in the insulation of said cylinder but out of thermal contact with the walls thereof for tumbling material in its course through said cylinder, said risers each being without interruption throughout the length of said cylinder, annular, spaced apart dams arranged at a predetermined point of highest heat concentration within the circumference of said cylinder and defining a plastic zone therebetween, said dams being effective to predetermine the bed depth of material in said zone and shaped for diverting the radiant energy of said flame from said material in its plastic stage.

6. Apparatus as set forth in claim 5, further defined in that a stationary feeding cylinder is disposed at the upper end of the calcining cylinder through which is passed products of combustion from said calcining cylinder and a coil of tubing within said feeding cylinder for transporting ore washing water to be heated through conduction by said products of combustion during its emergence from said cylinder.

JOHN B. DUBE.

REFERENCES CITED

The following references are of record in the file of this patent:

UNITED STATES PATENTS

| Number | Name | Date |
|---|---|---|
| 920,334 | Hughes | May 4, 1909 |
| 920,784 | Spackman | May 4, 1909 |
| 942,509 | Morgan | Dec. 7, 1909 |
| 1,065,597 | Edison | June 24, 1913 |
| 1,171,583 | Benson | Feb. 15, 1916 |
| 1,561,070 | Fujiyama | Nov. 10, 1925 |
| 1,690,820 | Hornsey | Nov. 6, 1928 |
| 1,809,563 | Newkirk | June 9, 1931 |
| 2,039,645 | Hechenbleikner | May 5, 1936 |
| 2,173,182 | Rønne | Sept. 19, 1939 |
| 2,229,383 | Lohse | Jan. 21, 1941 |
| 2,387,014 | Gibson | Oct. 16, 1945 |

FOREIGN PATENTS

| Number | Country | Date |
|---|---|---|
| 65,484 | Germany | Nov. 28, 1892 |
| 363,441 | Germany | Nov. 9, 1922 |